United States Patent
Koskinen et al.

(10) Patent No.: US 10,631,181 B2
(45) Date of Patent: Apr. 21, 2020

(54) BLER MEASUREMENTS FOR MBMS

(71) Applicant: Nokia Technologies Oy, Espoo (FI)

(72) Inventors: Jussi-Pekka Koskinen, Oulu (FI); Ilkka Keskitalo, Oulu (FI); Jorma Kaikkonen, Oulu (FI); Lars Dalsgaard, Oulu (FI); Jarkko Koskela, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/111,719

(22) PCT Filed: Jan. 26, 2015

(86) PCT No.: PCT/FI2015/050043
§ 371 (c)(1),
(2) Date: Jul. 14, 2016

(87) PCT Pub. No.: WO2015/114209
PCT Pub. Date: Aug. 6, 2015

(65) Prior Publication Data
US 2016/0330638 A1    Nov. 10, 2016

Related U.S. Application Data

(60) Provisional application No. 61/934,626, filed on Jan. 31, 2014.

(51) Int. Cl.
*H04W 24/08* (2009.01)
*H04W 4/06* (2009.01)
(Continued)

(52) U.S. Cl.
CPC ........... *H04W 24/08* (2013.01); *H04L 1/0035* (2013.01); *H04L 1/203* (2013.01); *H04L 12/189* (2013.01);
(Continued)

(58) Field of Classification Search
CPC ....... H04W 4/06; H04W 24/08; H04W 28/04; H04W 52/20; H04W 64/00; H04W 72/00;
(Continued)

(56) References Cited

U.S. PATENT DOCUMENTS 6,137,830 A * 10/2000 Schneider .......... H04B 17/0085
                                                        375/224
9,220,048 B2 * 12/2015 Schwartz ................ H04W 4/22
(Continued)

FOREIGN PATENT DOCUMENTS

CN          1505880 A      6/2004
CN        101094164 A     12/2007
(Continued)

OTHER PUBLICATIONS

International Search Report and Written Opinion received for corresponding Patent Cooperation Treaty Application No. PCT/FI2015/050043, dated Apr. 14, 2015, 13 pages.
(Continued)

*Primary Examiner* — Jeffrey M Rutkowski
*Assistant Examiner* — Chae S Lee
(74) *Attorney, Agent, or Firm* — Harrington & Smith

(57) ABSTRACT

Methods and apparatus, including computer program products, are provided for BLER measurements. In one aspect there is provided a method. The method may include performing, by a user equipment, a block error rate measurement on a channel of a multicast broadcast single-frequency network; and associating a metric with the block error rate measurement, wherein the metric comprises at least one of a reliability metric or an inaccuracy metric. Related apparatus, systems, methods, and articles are also described.

21 Claims, 4 Drawing Sheets

(51) Int. Cl.
  *H04L 12/26* (2006.01)
  *H04L 1/20* (2006.01)
  *H04L 1/00* (2006.01)
  *H04L 12/18* (2006.01)
  *H04W 72/00* (2009.01)
  *H04W 64/00* (2009.01)

(52) U.S. Cl.
  CPC ........... *H04L 43/0894* (2013.01); *H04W 4/06* (2013.01); *H04W 72/005* (2013.01); *H04L 2001/0093* (2013.01); *H04W 64/00* (2013.01)

(58) Field of Classification Search
  CPC .... H04W 72/005; H04W 76/002; H04L 1/00; H04L 1/203; H04L 12/18; H04L 12/189; H04L 43/0894; H04L 2001/0093
  See application file for complete search history.

(56) References Cited

U.S. PATENT DOCUMENTS

| | | | |
|---|---|---|---|
| 2004/0081248 A1 | 4/2004 | Parolari | 375/259 |
| 2004/0116142 A1* | 6/2004 | Wang | H03M 13/091 455/522 |
| 2004/0166899 A1* | 8/2004 | Nakayasu | H04W 28/16 455/560 |
| 2005/0025112 A1* | 2/2005 | Koo | H04L 1/20 370/342 |
| 2005/0073977 A1* | 4/2005 | Vanghi | H04W 36/0066 370/335 |
| 2005/0163047 A1* | 7/2005 | McGregor | H04W 24/00 370/229 |
| 2005/0282500 A1* | 12/2005 | Wang | H04L 1/20 455/67.13 |
| 2007/0155334 A1* | 7/2007 | Chang | H04L 1/0026 455/67.13 |
| 2007/0258405 A1* | 11/2007 | Kim | H04W 36/0066 370/331 |
| 2007/0275712 A1* | 11/2007 | Sebire | H04L 1/0061 455/424 |
| 2007/0298822 A1* | 12/2007 | Wan | H04L 1/1812 455/509 |
| 2008/0188216 A1* | 8/2008 | Kuo | H04W 24/08 455/424 |
| 2009/0031190 A1* | 1/2009 | Oosuge | H03M 13/2975 714/758 |
| 2009/0036116 A1* | 2/2009 | Kim | H04W 24/10 455/423 |
| 2009/0042601 A1* | 2/2009 | Wang | H04W 36/0088 455/553.1 |
| 2009/0131094 A1* | 5/2009 | Natsume | H04W 52/12 455/522 |
| 2009/0227251 A1* | 9/2009 | Lei | H04J 11/0069 455/425 |
| 2009/0287970 A1* | 11/2009 | Iizuka | H04L 1/0002 714/704 |
| 2009/0310501 A1* | 12/2009 | Catovic | H04W 24/08 370/252 |
| 2010/0020717 A1* | 1/2010 | McGregor | H04B 17/23 370/252 |
| 2010/0034092 A1 | 2/2010 | Krishnamurthy et al. | |
| 2010/0180160 A1* | 7/2010 | Kuo | G06F 11/0742 714/46 |
| 2010/0189048 A1* | 7/2010 | Baker | H04L 5/0037 370/329 |
| 2010/0197239 A1* | 8/2010 | Catovic | H04W 24/08 455/67.11 |
| 2011/0124340 A1* | 5/2011 | Puttonen | H04W 36/0083 455/437 |
| 2011/0182202 A1* | 7/2011 | Olofsson | H04J 11/0069 370/252 |
| 2011/0237288 A1* | 9/2011 | Ratasuk | H04W 52/146 455/522 |
| 2012/0311147 A1* | 12/2012 | Keskitalo | H04W 24/10 709/224 |
| 2012/0315949 A1* | 12/2012 | Zhang | H04W 24/08 455/525 |
| 2013/0010624 A1* | 1/2013 | He | H04L 41/5009 370/252 |
| 2013/0114446 A1* | 5/2013 | Liu | H04W 24/10 370/252 |
| 2013/0183978 A1* | 7/2013 | Keskitalo | H04W 24/10 455/436 |
| 2013/0188593 A1* | 7/2013 | Chen | H04B 7/063 370/329 |
| 2013/0286877 A1* | 10/2013 | Chung | H04W 24/02 370/252 |
| 2013/0308481 A1* | 11/2013 | Kazmi | H04W 24/02 370/252 |
| 2014/0044023 A1* | 2/2014 | Kazmi | H04W 28/18 370/278 |
| 2014/0064065 A1* | 3/2014 | Rogers | H04W 76/028 370/228 |
| 2014/0119334 A1* | 5/2014 | Kazmi | H04W 24/10 370/330 |
| 2014/0192698 A1* | 7/2014 | Anchan | H04W 4/06 370/312 |
| 2014/0200001 A1* | 7/2014 | Song | H04W 36/0094 455/436 |
| 2014/0226519 A1* | 8/2014 | Nagata | H04J 11/0053 370/252 |
| 2014/0286219 A1* | 9/2014 | Siomina | H04J 11/0023 370/311 |
| 2014/0301210 A1* | 10/2014 | Kim | H04W 24/08 370/241 |
| 2014/0341052 A1* | 11/2014 | Devarasetty | H04W 24/08 370/252 |
| 2014/0369340 A1* | 12/2014 | Horvat | H04W 56/0005 370/350 |
| 2015/0031308 A1* | 1/2015 | Schmidt | H04W 4/70 455/67.11 |
| 2015/0078428 A1* | 3/2015 | Balraj | H04B 1/1081 375/230 |
| 2015/0140999 A1* | 5/2015 | Zhang | H04W 36/0055 455/424 |
| 2015/0141027 A1* | 5/2015 | Tsui | H04W 52/243 455/452.1 |
| 2015/0148050 A1* | 5/2015 | Siomina | H04J 11/005 455/452.1 |
| 2015/0173064 A1* | 6/2015 | Kim | H04B 7/26 370/252 |
| 2016/0211980 A1* | 7/2016 | Zhu | H04W 4/06 |
| 2016/0309355 A1* | 10/2016 | Seo | H04W 8/005 |
| 2016/0374050 A1* | 12/2016 | Prasad | H04W 4/06 |

FOREIGN PATENT DOCUMENTS

| | | |
|---|---|---|
| CN | 101998260 A | 3/2011 |
| CN | 102223206 A | 10/2011 |
| CN | 102611521 A | 7/2012 |
| WO | 2008052382 | 5/2008 |
| WO | 2010053793 | 5/2010 |

OTHER PUBLICATIONS

3GPP R4-143543, MBSFN BLER measurements, Nokia Corporation, NSN, Seoul Korea, May 19-23, 2014.
3GPP R4-142774, On MBMS BLER measurement, Qualcomm INcorporated, Seoul, Korea, May 19-23, 2014.
"Way Forward on MBSFN BLER measurements", 3GPP TSG-RAN WG4 Meeting #72, R4-145375, Nokia Networks, Aug. 18-22, 2014, 4 pages.
"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11)", 3GPP TS 37.320, V11.3.0, Mar. 2013, pp. 1-23.

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331, V12.0.0, Dec. 2013, pp. 1-349.

"3rd Generation Partnership Project; Technical Specification Group Services and System Aspects; Telecommunication management; File Transfer (FT) Integration Reference Point (IRP): Common Management Information Protocol (CMIP) Solution Set (SS) (Release 6)", 3GPP TS 32.344, V6.0.0, Dec. 2004, pp. 1-15.

"CR on Measurement for MBSFN MDT", 3GPP TSG-RAN WG4 Meeting #73, R4-147872, Nokia Network, Nov. 17-21, 2014, 4 pages.

"Measurement and Reporting of BLER in Section 9", 3GPP TSG-RAN WG4 Meeting #73, R4-147875, Nov. 17-21, 2014, 3 pages.

"3rd Generation Partnership Project; Technical Specification Group Radio Access Network; Evolved Universal Terrestrial Radio Access (E-UTRA); LTE physical layer; General description (Release 13)", 3GPP TS 36.201, V13.2.0, Jun. 2016, pp. 1-14.

"3rd Generation Partnership Project; Technical Specification Group Radio Access Network; Evolved Universal Terrestrial Radio Access (E-UTRA); Physical channels and modulation (Release 13)", 3GPP TS 36.211, V13.2.0, Jun. 2016, pp. 1-168.

"3rd Generation Partnership Project; Technical Specification Group Radio Access Network; Evolved Universal Terrestrial Radio Access (E-UTRA); Multiplexing and channel coding (Release 13)", 3GPP TS 36.212, V13.2.0, Jun. 2016, pp. 1-140.

"3rd Generation Partnership Project; Technical Specification Group Radio Access Network; Evolved Universal Terrestrial Radio Access (E-UTRA); Physical layer procedures (Release 13)", 3GPP TS 36.213, V13.2.0, Jun. 2016, pp. 1-381.

"3rd Generation Partnership Project; Technical Specification Group Radio Access Network; Evolved Universal Terrestrial Radio Access (E-UTRA); Physical layer; Measurements (Release 13)", 3GPP TS 36.214, V13.2.0, Jun. 2016, pp. 1-19.

Extended European Search Report received for corresponding European Patent Application No. 15743258.4, dated Sep. 29, 2017, 6 pages.

"Measurements for PMCH MCS Adaptation", 3GPP TSG RAN WG1 Meeting #75, R1-135030, Huawei, Agenda Item: 6.2.5, Nov. 11-15, 2013, 5 pages.

Huawei et al.; "Measurements for PMCH MCS adaptation"; R1-135030; 3GPP TSG RAN WG1 Meeting #75; San Francisto, USA; Nov. 11-15, 2013; whole document (5 pages).

\* cited by examiner

BLER MEASUREMENTS FOR MBMS

RELATED APPLICATION

This application was originally filed as PCT Application No. PCT/FI2015/050043 filed Jan. 26, 2015 which claims priority benefit from U.S. Provisional Application No. 61/934,626, filed Jan. 31, 2014.

FIELD

The subject matter disclosed herein relates to wireless communications.

BACKGROUND

In the Third Generation Partnership Project (3GPP), Multimedia Broadcast Multicast Services (MBMS) relates to broadcast and multicast services provided via cellular. For example, the cellular network may provide an application, such as mobile television, to a user equipment using for example a multicast broadcast single-frequency network (MBSFN) in which base stations transmit on the same frequency in a coordinated way to provide the mobile television broadcast. The user equipment may be configured to perform measurements of the MBSFN, and report those measurements to the network. The measurement and reporting may be directed by the network (for example, as part of minimization of drive testing measurements).

MDT measurement and subsequent reporting may include two modes referred to herein as immediate MDT and logged MDT. MDT reports from the user equipment to the network may be immediate, when the user equipment is in an active, or a connected mode. This immediate reporting corresponds to the normal reporting expectations for radio resource management (RRM). Moreover, the MDT reports sent by the user equipment to the network may be triggered by an event, such as signal level going below a given threshold, periodically triggered by a timer, and the like. In the case of MDT reporting when the user equipment is in an idle mode, in which case immediate MDT reporting is not possible, the user equipment may record (also referred to as log) MDT measurements made by the user equipment and wait until a connection is available between the user equipment and the network in order to send the MDT report.

SUMMARY

Methods and apparatus, including computer program products, are provided for block error rate for MBMS.

In some example embodiments, there may be provided a method. The method may include performing, by a user equipment, a block error rate measurement on a channel of a multicast broadcast single-frequency network; and associating a metric with the block error rate measurement, wherein the metric comprises at least one of a reliability metric or an inaccuracy metric.

In some example embodiments, one of more variations may be made as well as described in the detailed description below and/or as described in the following features The user equipment may map the block error rate measurement to a block error rate measurement category. A quantity of received blocks during a measurement period may be indicative of the at least one of the reliability metric or the inaccuracy metric. The quantity of received blocks may be mapped into a category indicative of the block error rate measurement and the metric. A lower quantity of the received blocks may indicate less reliability, when compared to a higher quantity of the received blocks. A logging interval may be configured as the measurement period for the block error rate measurements. A location may be determined, wherein the location may be representative of where the block error rate measurement is performed. A time limit may be associated with the block error rate measurement, the mapped block error rate measurement category, the determined location, or a combination thereof. Measurement logging may be performed of at least one of the block error rate measurement, the mapped block error rate measurement category, the determined location, the time limit, or the metric, when in a minimization of drive testing mode. The logged measurements may be reported. Based on at least one of the time limit or the metric, a logging of at least one of the block error rate measurement, the mapped block error rate measurement category, and/or the determined location may be inhibited.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the subject matter disclosed herein. In the drawings.

Figure 1:
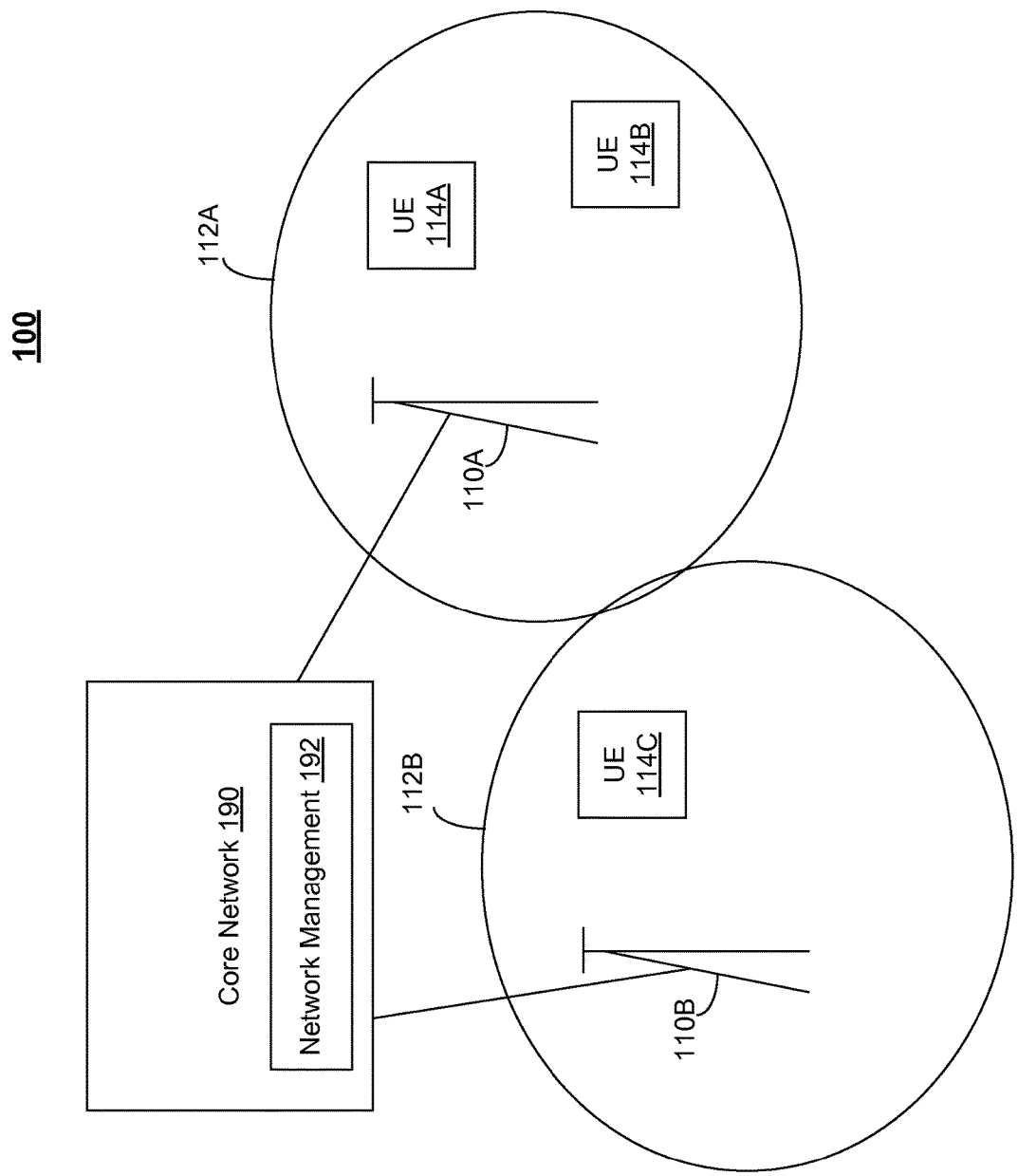
FIG. 1 depicts an example of a system, in accordance with some example embodiments.

Like labels are used to refer to same or similar items in the drawings.

DETAILED DESCRIPTION

Multimedia Broadcast Multicast Services (MBMS) may include providing one or more measurement enhancements to enable services provided by MBMS via a Multimedia Broadcast Single-Frequency Network (MBSFN). For example, user equipment may perform MBSFN measurements and record the measurements and a corresponding geographic location of the user equipment to allow verification of actual MBSFN signal reception, planning and (re)configuration tasks for MBSFN areas, and/or selection of MBMS operational parameters.

Moreover, the user equipment may be configured to perform and/or report the MBSFN measurements, such as reference signal received quality (RSRQ), reference signal received power (RSRP), block error rate (BLER), received signal strength indicator (RSSI), and the like, and these measurements may be implemented as part a minimization of drive test (MDT) functionality.

Block error rate (BLER) refers to a ratio of a quantity of number of erroneous transport blocks received via an MBMS multicast transport channel (MCH) to a total quantity of number of transport blocks received via the MCH. In the case of 3GPP, the BLER measurement may be over a modulation-coding-scheme (MCS) per MBSFN area, and the measurements may be performed only in subframes and carriers where the user equipment is decoding the PMCH (Physical Multicast Channel).

In some example embodiments, the BLER measurements may be performed with respect to the PMCH, which includes the MBMS service which is of interest for the user equipment (or user). There may not be a requirement for the user equipment to decode blocks other than those carrying MBMS service of interest, and scheduling of the MBMS services may be defined in a media access control (MAC) control element (CE) with the MCH scheduling information, MSI). The MAC control element may list the MBMS services and the schedule (for example, configured MBMS sub-frames) in which the services will be transmitted by base stations during a scheduling period. The MSI may be sent on a MAC control element at the beginning of the scheduling period. This allows flexibility for the network to allocate the PMCH resources within and between the scheduling periods. This in turn may result in a lack of regular transmission of MBMS transport blocks on the MCH. Thus, BLER measurement may need to be able cope with the dynamic nature of the MBMS traffic.

Requirements for BLER measurement may depend on a service type and a related traffic pattern that the user equipment is going to receive. When utilizing the MDT functionality and measurement logging in MBMS, there may also be a time limitation, in some example embodiments, for how long a BLER measurement period can be or how long time the information, to be associated with a single BLER result, can be considered valid.

In the MDT measurement logging case for MBMS, measurement logging and/or reporting may also have a certain periodicity, which may be defined by a measurement configuration. Moreover, MDT measurement results may, in some example embodiments, be associated with location information indicating a location of where the measurement was made (for example, a location of the user equipment), and this location information may, in some example embodiments, also have the time limitation with respect to validity of the location information (and/or the BLER measurement itself). The time limit may represent a duration over which the BLER measurement can be done and/or location information is valid. As such, the time limit may ensure the validity of the associated data, such as location information as well as other associated measurement results. If the location information is not valid, the BLER measurement results may be less useful to the network as the measurements may no longer map to the user equipment's location.

In some example embodiments, the user equipment may perform validity checking of the location information, and this validity may depend, as noted, on a time limit, after which location information is invalid (or at the very least suspect with respect to validity).

In some example embodiments, any time limitation may be logged along with the BLER measurement and/or reported with the BLER measurement to the network. The time limit for the BLER measurement (for example due to limited validity of the location information) may be tagged/linked to the logged BLER measurement result. The actual measurement period, due to time limitation, may be included in the log entry. The format of the time limitation may be indicated as a fraction of the logging or reporting period configured BLER measurements. In addition, absolute time of the measurement period may be informed.

In some example embodiments, the time limit may be fixed for a given BLER measurement based on an MDT measurement configuration for logging/reporting periodicity.

If the location validity time exceeds a BLER measurement period or a measurement logging period, the BLER measurement may not be affected and no indication may be needed for additional restriction of the time for BLER measurement. For example, if the location validity time is 10 seconds, but the BLER measurement period or measurement logging period is 2 seconds, then the BLER measurements are not affected by the validity time as new BLER measurements are made before reaching the time limit.

In some example embodiments, the user equipment may count the number of blocks received and how many of the blocks were not successfully decoded. A determination of successful decoding may be based on a check of a cyclic redundancy check (CRC) associated with one or more received blocks (or, more generally on a decoding function). In some example embodiments, the user equipment may calculate BLER as a ratio between erroneously decoded transport blocks received at the user equipment during the measurement period via for example a MCH and a total number of received transport blocks received at the user equipment via for example the MCH.

Moreover, the calculated BLER may, in some example embodiments, be categorized by for example mapping the calculated BLER into a BLER range. For example, the calculated BLER may map to at least one BLER category, such as less than 1% (<1%), 1-5%, 6-15%, 15-30%, 30-50%, >50%, although other categories may be used as well. This categorization may simplify logging and reporting by the user equipment as the user equipment may only need, in this example, about 3 bits to record and/or report one of the six categories. Given the dynamic nature of MBMS, this mapping may reduce the burden associated with logging and reporting the BLER to the network.

In some example embodiments, the categories used for the mapping may vary based on one or more conditions/factors. For example, there may be multiple definitions for BLER categorization depending on a minimum accuracy or granularity requirement.

Returning to the previous set of categories, one or more additional categories may be used below 1%, such as less than 0.25%, 0.26%-0.5%, and so forth.

Furthermore, a reporting range may be set unevenly around the network target level, and the reporting range may be defined to be dependent on a network interest target level. For example, the reporting granularity may be set in an uneven manner to allocate more reporting range to inform the network about how much the BLER exceeds the target level, while leaving only one or limited amount for cases in which the quality is better (for example, lower BLER instances) than the network indicates. For example, categories may be set for reporting, such as less than 10%, and then 11%-12%, 13%-14%, and 15%-16%. In this example, the network may be interested in the degree the BLER exceeds the 10% threshold, so logging and reporting granularity may be binned unevenly above 10%.

Moreover, the number of categories may be varied. In the previous example, there are 6 categories (which require 3 bits to identify each category. However, the number of categories may be increased or decreased as well. For example, two categories may be used (which requires a single bit to identify the two categories. When this is the case, the single bit may indicate whether the calculated BLER measurement maps to one of the two categories (for example, above or below a certain BLER threshold). To illustrate further, a network may configure the user equipment to report BLER when it exceeds a certain value, such as 10%, so the first category may be less than or equal to 10% and the second category may be greater than 10% BLER. In this example, the user equipment may only report to the network occasions when the measured BLER is above that 10% threshold, and, as such, BLER reporting or logging (including time and location information, and/or RSRP/RSRQ measurement results) may be limited to time instances where the BLER threshold has been exceeded.

In some example embodiments, the BLER category may be associated with a reliability (or inaccuracy) metric. For example, depending on a quantity of received blocks during the measurement period, the BLER result (or mapped BLER category) may be associated with an indicator of the reliability of the BLER result or mapped BLER category. For example, a lower amount of received blocks may indicate that the BLER result or mapped category may be less reliable, when compared to a BLER result or mapped BLER category determined using a higher quantity of received blocks.

In some example embodiments, the reliability metric may be implemented in a variety of ways. For example, the metric may indicate a range, such as plus or minus a certain percentage value (for example, +/−x % accuracy). Additionally or alternatively, the metric may represent a likelihood or probability of being out of the indicated BLER category.

The indication of reliability of the BLER result or mapped BLER category may also be used to reduce the amount of data to be stored/logged at the user equipment and subsequently reported. In some example embodiments, the quantity of the blocks received at a user equipment may be coded into a category, such as less than 10 (<10), 10-100, 100-1000, and so forth. The reported inaccuracy may point to one of the categories which may enable a reduction in the amount of data to be stored (or logged) at the user equipment and reported to the network. For example, BLER reporting and logging may be enabled only if the reliability exceeds a reliability threshold.

Other statistical/mathematical metrics derived from the number of received blocks can be used as an indication about the reliability of the BLER result (for example, that is, how well the calculated BLER matches with a longer term BLER result).

In some example embodiments, BLER reporting and/or logging may be enabled only when there is a sufficient number of transport blocks received by the user equipment. The required amount of samples may be configured (for example, by the network, a standard, or in other ways) or may vary based on the validity time limit for the location information or based on logging periodicity.

In some example embodiments, BLER measurement reporting may have a measurement period which may be the same or similar to the logging periodicity. The BLER measurement results and associated reliability metric may provide sufficient information for the network to determine whether the reception quality is problematic. Moreover, other measurements, such as RSRP or RSRQ measurement results, may also be used by for example the network to deduce if potential problems are due to coverage issues or inappropriate configuration of the MBSFN transmission.

Before providing additional examples regarding the BLER measurements disclosed herein, the following provides a description of a system, in accordance with some example embodiments.

FIG. 1 depicts a system 100 including a core network 190, a plurality of base stations 110A-B serving cells 112A-B, where user equipment 114A-C are located, in accordance with some example embodiments. The mobile network may be divided into radio access network (RAN) and core network (CN). The mobile network 190 may include a network management system 192, which may further include a minimization of drive testing (MDT) function. The radio access network may consist of at least base stations that serve a particular cell or multiple cells. The user equipment may locate within the coverage area of a cell or multiple cells. The base stations may also be configured as an evolved Node B (eNB) type base station, although other types of base stations and access points may be used as well. In the case of MBSFN, multiple synchronized base stations may take part in an MBSFN transmission, and a user equipment may use a plurality of available MBSFN transmit signals from the base stations in order to maximize reception quality.

Although FIG. 1 depicts a certain quantity and configuration of devices, other quantities and configurations may be implemented as well. For example, other quantities and configurations of base stations, cells, and user equipment may be implemented as well.

In some example embodiments, user equipment 114A-C may be implemented as a mobile device and/or a stationary device. The user equipment 114A-C are often referred to as, for example, mobile stations, mobile units, subscriber stations, wireless terminals, tablets, smart phones, wireless devices, devices, or the like. A user equipment may be implemented as, for example, a wireless handheld device, a wireless plug-in accessory, or the like. In some example embodiments, user equipment 114A-C may be implemented as multi-mode user devices configured to operate using a plurality of radio access technologies, although a single-mode device may be used as well. For example, user equipment 114A-C may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), near field communications (NFC), and any other radio access technologies.

Base stations 110A-B may, in some example embodiments, be implemented as an evolved Node B (eNB) type base station as noted above, although other types of radio access points may be implemented as well. When the evolved Node B (eNB) type base station is used, the base station may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base station may also be configured to serve cells using a WLAN technology, such as WiFi (for example, the IEEE 802.11 series of standards), as well as any other radio access technology capable of serving a cell. Moreover, the base stations may be configured to provide a synchronized MBSFN transmission to user equipment.

Base stations 110A-B may have wired and/or wireless backhaul links to other networks and/or network nodes including core network 190. The mobile network 190 may include the network management entity 192, which may include minimization of drive testing functions.

Figure 2:
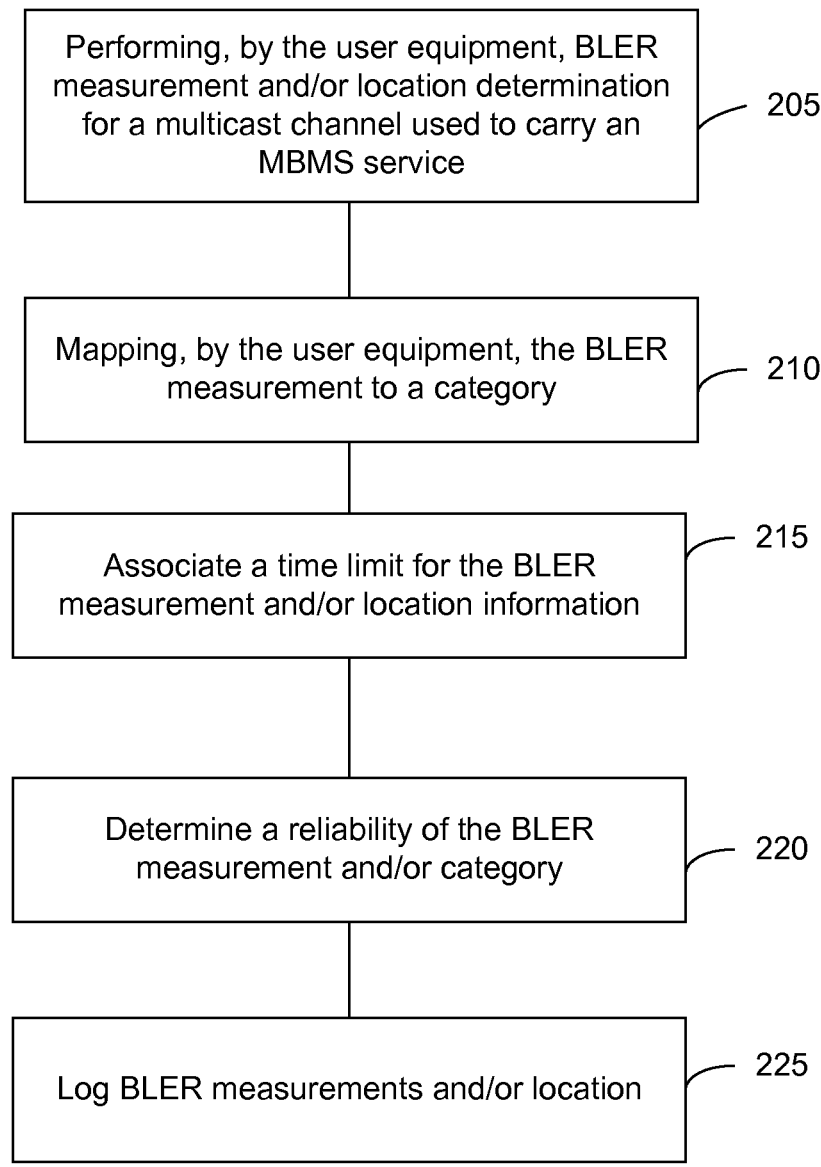
FIG. 2 depicts an example of a process for BLER measurements, in accordance with some example embodiments.

FIG. 2 depicts an example process 200 for BLER measurements, in accordance with some example embodiments. The description of process 200 also refers to FIG. 1.

At 205, a user equipment may perform a BLER measurement for MBSFN and/or determine a location representative of where the user equipment is when the measurement in made, in accordance with some example embodiments. For example, user equipment 114A may perform a BLER measurement on a MBSFN channel and determine the user equipment's location when the measurement is performed.

At 210, a user equipment may map the BLER measurement to a category, in accordance with some example embodiments. For example, user equipment 114A may map the measurement performed at 205 to a category, such as <10% or greater than 10%, although other categories may be used as well.

At 215, the user equipment may associate a time limit indicative of a time over which the BLER measurement, category, and/or location information is considered valid, in accordance with some example embodiments. For example, user equipment 114A may associate a time limit (which may be signaled by the network, specified by a standard) with the BLER measurement, category, and/or location information. Moreover, the time limit may be a fixed time, or dynamic in the sense that the time limit may be varied depending on a BLER measurement, mobility status, and the like.

At 220, a user equipment 114 may determine a reliability of the BLER measurement and/or category, in accordance with some example embodiments. For example, user equipment 114A may determine how many transport blocks were received, as noted above, to assess the reliability of the BLER measurement. To illustrate, a BLER measurement using a relatively large quantity of received blocks may be considered more reliable than a BLER measurement using a few BLER blocks.

At 225, the user equipment may log the BLER measurements, location information, and/or other information (for example, other measurements, time limits, reliability indicators, and the like), in accordance with some example embodiments. For example, user equipment 114A may perform one or more aspects of process 200 and log the measurement as part of a logged MDT measurement mode to enable subsequent reporting to the network, although other MDT modes may be used as well. As noted above, the reliability indicator and/or time limits may be used to enable (or inhibit) logging and/or reporting. For example, the BLER result may not be logged or reported if the user equipment has not received sufficient number of transport blocks during the BLER measurement period. Moreover, the logged and/or reported measurements may be mapped into categories as noted above.

Figure 3:
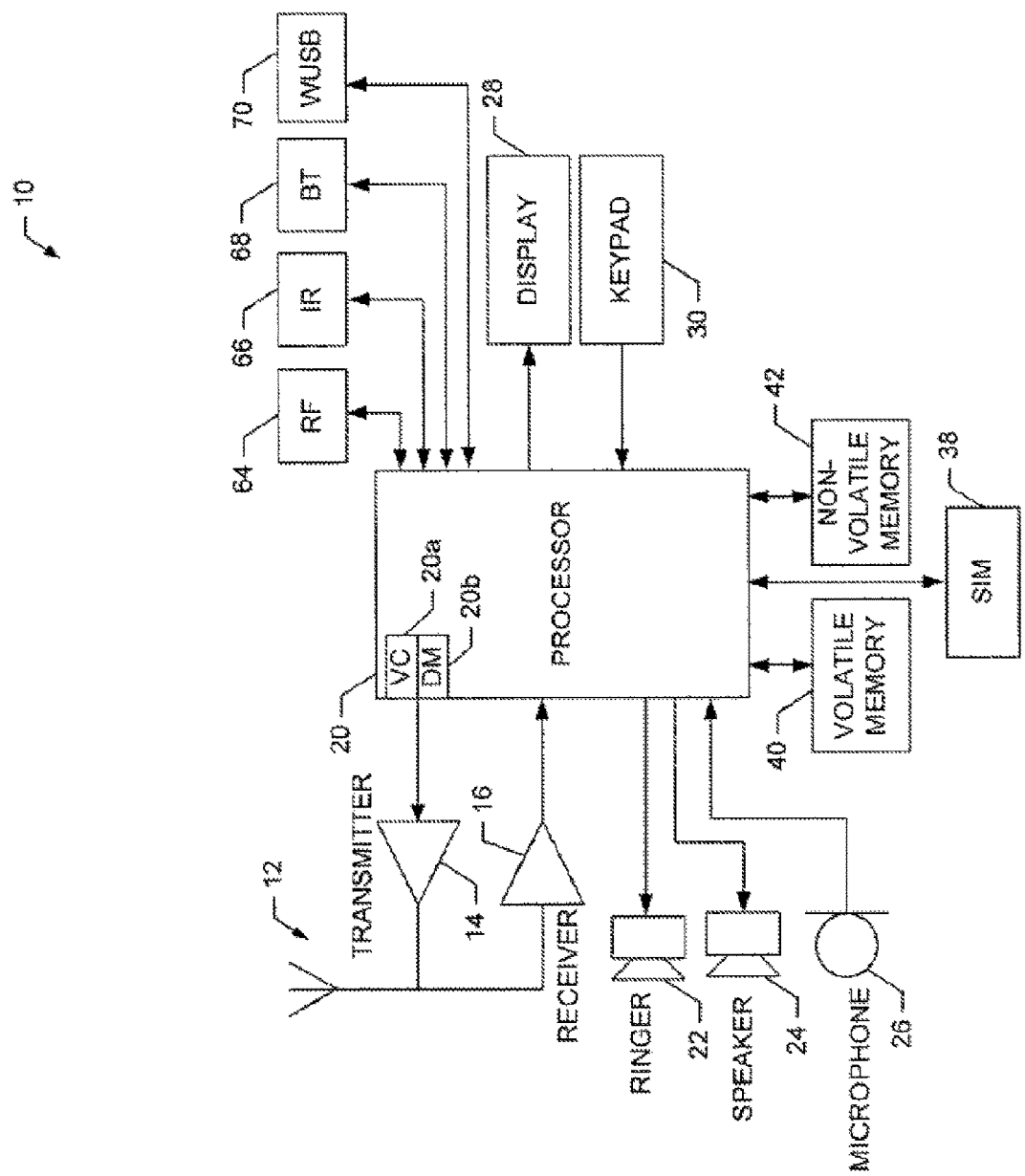
FIG. 3 depicts an example of a user equipment, in accordance with some example embodiments.

FIG. 3 illustrates a block diagram of an apparatus 10, in accordance with some example embodiments. For example, apparatus 10 may comprise a radio, such as a user equipment, a smart phone, mobile station, a mobile unit, a subscriber station, a wireless terminal, a tablet, a wireless plug-in accessory, a wireless access point, a base station, and/or or any other device with device having a transceiver.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 3 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 3, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the WiFi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, a UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing process 200 and the like, and other operations associated with a user equipment. The memories may comprise an identifier, such as an international mobile equipment identification (IMEI) code, capable of uniquely identifying apparatus 10. The functions may include one or more of the operations disclosed herein with respect to the user equipment. The memories may comprise an identifier, such as an international mobile equipment identification (IMEI) code, capable of uniquely identifying apparatus 10. In the example embodiment, the processor 20 may be configured using computer code stored at memory 40 and/or 42 to perform user equipment operations disclosed herein including process 200 and the like.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 3, computer-readable medium may comprise a non-transitory computer-readable storage medium that may be any media that can contain or store the instructions for use by or in connection with an instruction execution system, apparatus, or device, such as a computer. For example, the computer-readable medium may include computer program code which when executed by processor circuitry may provide user equipment operations disclosed herein with respect to process 200 and the like.

Figure 4:
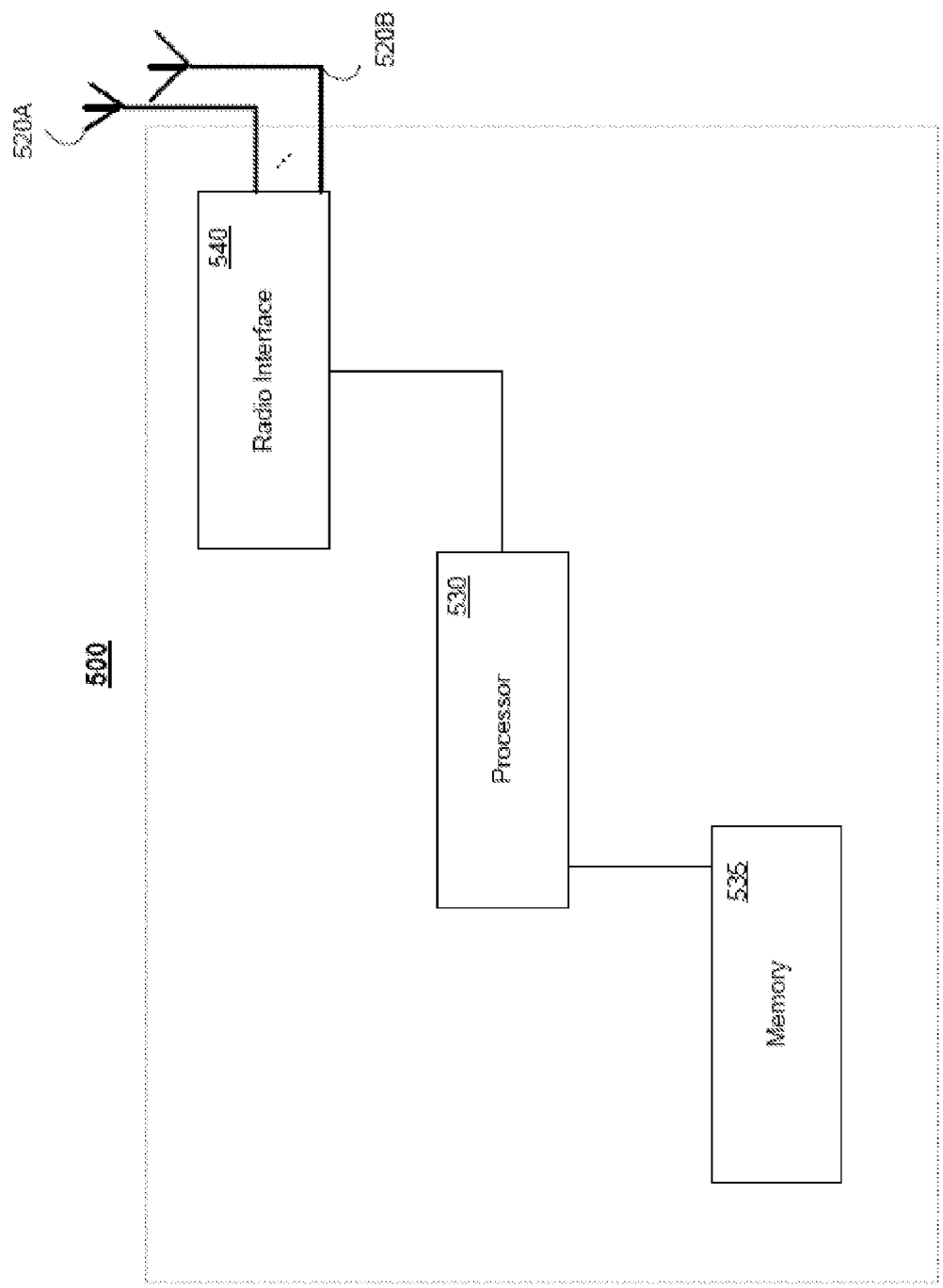
FIG. 4 depicts an example of an access point, in accordance with some example embodiments.

FIG. 4 depicts an example implementation of a wireless access point 500, which may be implemented at for example base station 110, in accordance with some example embodiments. The wireless access point may include one or more antennas 520 configured to transmit via downlinks and configured to receive uplinks via the antenna(s) 520. The wireless access point may further include a plurality of radio interfaces 540 coupled to the antenna(s) 520. The radio interfaces 540 may correspond to a plurality of radio access technologies including one or more of LTE, WLAN, Bluetooth, Bluetooth low energy, NFC, radio frequency identifier (RFID), ultrawideband (UWB), ZigBee, ANT, and the like. The radio interface 540 may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). The wireless access point may further include one or more processors, such as processor 530, for controlling the wireless access point 500 and for accessing and executing program code stored in memory 535. In some example embodiments, the memory 535 includes code, which when executed by at least one processor, causes one or more of the operations described herein with respect to a network node, such as base station 110A-B. For example, the wireless access point 500 may be configured to send measurement configuration information to allow a user equipment to perform process 200, receive measurements made by the user equipment, and the like.

Without in any way limiting the scope, interpretation, or application of the claims appearing below, a technical effect of one or more of the example embodiments disclosed herein is a consistent way to perform BLER measurement when the measurement time is limited due to MBMS and the number of received measurement samples vary due to MBMS, a reduction in amount of stored data about a measurement result, and/or a provision of sufficient information with a reduced number of bits in order for the network to determine whether the MBSFN multicasting provides sufficient coverage and radio performance.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

The invention claimed is:

1. A method comprising:
performing, by a user equipment, a block error rate measurement on a channel of a multicast broadcast single-frequency network;
associating a metric with the block error rate measurement, wherein the metric comprises at least a multi-bit inaccuracy metric, wherein a quantity of received blocks during a measurement period is indicative of the inaccuracy metric, and wherein the metric comprises the quantity of received blocks; and
causing the user equipment to transmit both the metric comprising the quantity of received blocks and the block error rate measurement within a same report, wherein the metric and the block error rate measurement are to be configured by at least one network device and implemented by the user equipment in a minimization of drive testing function.

2. The method of claim 1 further comprising:
mapping, by the user equipment, the block error rate measurement to a block error rate measurement category.

3. The method of claim 1, wherein the quantity of received blocks is mapped into a category indicative of the block error rate measurement and the metric.

4. The method of claim 1 further comprising:
configuring a logging interval as the measurement period for the block error rate measurements.

5. The method of claim 1 further comprising:
determining a location representative of where the block error rate measurement is performed.

6. The method of claim 1 further comprising:
associating a time limit with the block error rate measurement, the mapped block error rate measurement category, the determined location, or a combination thereof.

7. The method of claim 1 further comprising:
logging measurements including at least one of the block error rate measurement, the mapped block error rate measurement category, the determined location, the time limit, or the metric, when in a minimization of drive testing mode.

8. The method of claim 1 further comprising:
inhibiting, based on at least one of the time limit or the metric, a logging of at least one of the block error rate measurement, the mapped block error rate measurement category, or the determined location.

9. An apparatus, comprising:
at least one processor; and
at least one memory including computer program code, the at least one memory and the computer program code configured to, with the at least one processor, cause the apparatus to perform at least the following:
perform, by the apparatus, a block error rate measurement on a channel of a multicast broadcast single-frequency network;
associate a metric with the block error rate measurement, wherein the metric comprises at least a multi-bit inaccuracy metric, wherein a quantity of received blocks during a measurement period is indicative of the inaccuracy metric, and wherein the metric comprises the quantity of received blocks; and
cause the apparatus to transmit both the metric comprising the quantity of received blocks and the block error rate measurement within a same report, wherein the metric and the block error rate measurement are to be configured by at least one network device and implemented by the apparatus in a minimization of drive testing function.

10. The apparatus of claim 9, wherein the at least one memory and computer program instructions are further configured to, with the at least one processor, cause the apparatus at least to:
map the block error rate measurement to a block error rate measurement category.

11. The apparatus of claim 9, wherein the quantity of received blocks is mapped into a category indicative of the block error rate measurement and the metric.

12. The apparatus of claim 9, wherein a lower quantity of the received blocks indicates less accuracy as reflected in the metric, when compared to a higher quantity of the received blocks.

13. The apparatus of claim 9, wherein the at least one memory and computer program instructions are further configured to, with the at least one processor, cause the apparatus at least to:
configure a logging interval as the measurement period for the block error rate measurements.

14. The apparatus of claim 9, wherein the at least one memory and computer program instructions are further configured to, with the at least one processor, cause the apparatus at least to:
determine a location representative of where the block error rate measurement is performed.

15. The apparatus of claim 9, wherein the at least one memory and computer program instructions are further configured to, with the at least one processor, cause the apparatus at least to:
associate a time limit with the block error rate measurement, the mapped block error rate measurement category, the determined location, or a combination thereof.

16. The apparatus of claim 9, wherein the at least one memory and computer program instructions are further configured to, with the at least one processor, cause the apparatus at least to:
log measurements including at least one of the block error rate measurement, the mapped block error rate measurement category, the determined location, the time limit, or the metric, when in a minimization of drive testing mode.

17. The apparatus of claim 9, wherein the at least one memory and computer program instructions are further configured to, with the at least one processor, cause the apparatus at least to:
inhibit, based on at least one of the time limit or the metric, a logging of at least one of the block error rate measurement, the mapped block error rate measurement category, or the determined location.

18. A non-transitory computer-readable storage medium including computer program code, which when executed by at least one processor causes operations comprising:
performing, by a user equipment, a block error rate measurement on a channel of a multicast broadcast single-frequency network; and
associating a metric with the block error rate measurement, wherein the metric comprises at least a multi-bit inaccuracy metric, wherein a quantity of received blocks during a measurement period is indicative of the inaccuracy metric, and wherein the metric comprises the quantity of received blocks; and
causing the user equipment to transmit both the metric comprising the quantity of received blocks and the block error rate measurement within a same report, wherein the metric and the block error rate measurement are to be configured by at least one network device and implemented by the user equipment in a minimization of drive testing function.

19. The non-transitory computer-readable storage medium including computer program code of claim 18, which when executed by the at least one processor causes operations further comprising:
mapping, by the user equipment, the block error rate measurement to a block error rate measurement category.

20. The method of claim 1, wherein the inaccuracy metric indicates at least one category that enables a reduction in an amount of data to be reported.

21. The method of claim 3, further comprising transmitting the mapped category of the quantity of received blocks within the same report.

* * * * *